United States Patent
Yakabe et al.

(10) Patent No.: US 7,903,165 B2
(45) Date of Patent: Mar. 8, 2011

(54) CAMCORDER WITH A DISPLAY

(75) Inventors: Toshiyuki Yakabe, Kanagawa-ken (JP); Khairul Azhar Bin Mukhtar, Selangor (MY)

(73) Assignee: Victor Company of Japan, Limited, Yokohama (JP)

( * ) Notice: Subject to any disclaimer, the term of this patent is extended or adjusted under 35 U.S.C. 154(b) by 342 days.

(21) Appl. No.: 12/177,293

(22) Filed: Jul. 22, 2008

(65) Prior Publication Data

US 2009/0060466 A1    Mar. 5, 2009

(30) Foreign Application Priority Data

Aug. 28, 2007  (MY) .............................. PI 20071447

(51) Int. Cl.
*H04N 5/222*    (2006.01)
(52) U.S. Cl. .................................... 348/333.06; 348/376
(58) Field of Classification Search ........................ None
See application file for complete search history.

(56) References Cited

U.S. PATENT DOCUMENTS

| | | | | |
|---|---|---|---|---|
| 2004/0157653 A1* | 8/2004 | Kato | .......................... | 455/575.4 |
| 2005/0083642 A1* | 4/2005 | Senpuku et al. | .............. | 361/681 |
| 2005/0221873 A1* | 10/2005 | Kameyama et al. | ........ | 455/575.4 |
| 2006/0128190 A1* | 6/2006 | Kato | .............................. | 439/157 |
| 2007/0296820 A1* | 12/2007 | Lonn | ........................ | 348/207.99 |
| 2008/0002343 A1* | 1/2008 | Baek | ............................. | 361/680 |

FOREIGN PATENT DOCUMENTS

| | | | |
|---|---|---|---|
| JP | 06-088995 A | | 3/1994 |
| JP | 07-298109 A | | 11/1995 |
| JP | 2000196988 A | * | 7/2000 |
| WO | WO 2006067259 A1 | * | 6/2006 |

OTHER PUBLICATIONS

JVC, "Instructions for Digital Video Camera GR-DA30AA", located at http://www.jvc-australia.com/JVCstores/PRODUCTS/321/AT-TRFILE_File3/Inst_GR-DA30AA.pdf , Jul. 9, 2007.*
Letsgomobile.org, "JVC GR DA20 video camera", located at http://www.letsgomobile.org/en/1903/jvc-gr-da20/ , Sep. 1, 2007.*

* cited by examiner

*Primary Examiner* — Lin Ye
*Assistant Examiner* — Dennis Hogue
(74) *Attorney, Agent, or Firm* — Marvin A. Motsenbocker; Mots Law, PLLC

(57) ABSTRACT

A camcorder has a main body, a lens, which is provided on a front surface portion of the main body, and a display unit having a display screen, which displays incoming images from the lens. A first surface of a rear surface portion of the main body faces the display unit and is concave toward the front surface portion of the main body. A second surface of the display unit faces the first surface. The second surface is convex toward the front surface portion of the main body corresponding to the first surface. The first surface slidably moves the display unit with respect to the second surface.

7 Claims, 10 Drawing Sheets

CAMCORDER WITH A DISPLAY

CROSS REFERENCE TO RELATED APPLICATIONS

This application is based upon and claims the benefit of priority from Malaysian Patent Application No. PI 20071447 filed on Aug. 28, 2007, IMPROVEMENTS IN CAMCORDERS the entire contents of which are incorporated herein by reference.

BACKGROUND OF THE INVENTION

1. Field of the Invention

The invention relates generally to a camcorder, and more particularly, to a camcorder having a display screen connected rotably to a body.

2. Description of Related Art

A camcorder comprises a display screen which displays an image being shot by a user.

Japanese Patent Application No. H06-088995/1994 discloses a camcorder having a display screen (LCD Panel) on one side of a body. The display screen rotates perpendicularly to the axis of a lens provided on the body. It is necessary to handle the camcorder of the related art with care while using the display screen. When the camcorder is roughly handled or dropped, a hinge that allows pivotal movement of the display screen may break.

SUMMARY OF THE INVENTION

An aspect of the invention provides a camcorder having a display screen connected rotably to a body.

An embodiment of the invention provides a camcorder that comprises a main body, a lens provided on a front surface portion of the main body. The camcorder further comprises a display unit having a display, which displays an image from the lens. The display unit is provided on a rear surface portion of the main body opposite to the front surface portion. The display unit slides along the rear surface portion in up and down directions of the main body.

DETAILED DESCRIPTION

Figure 1:
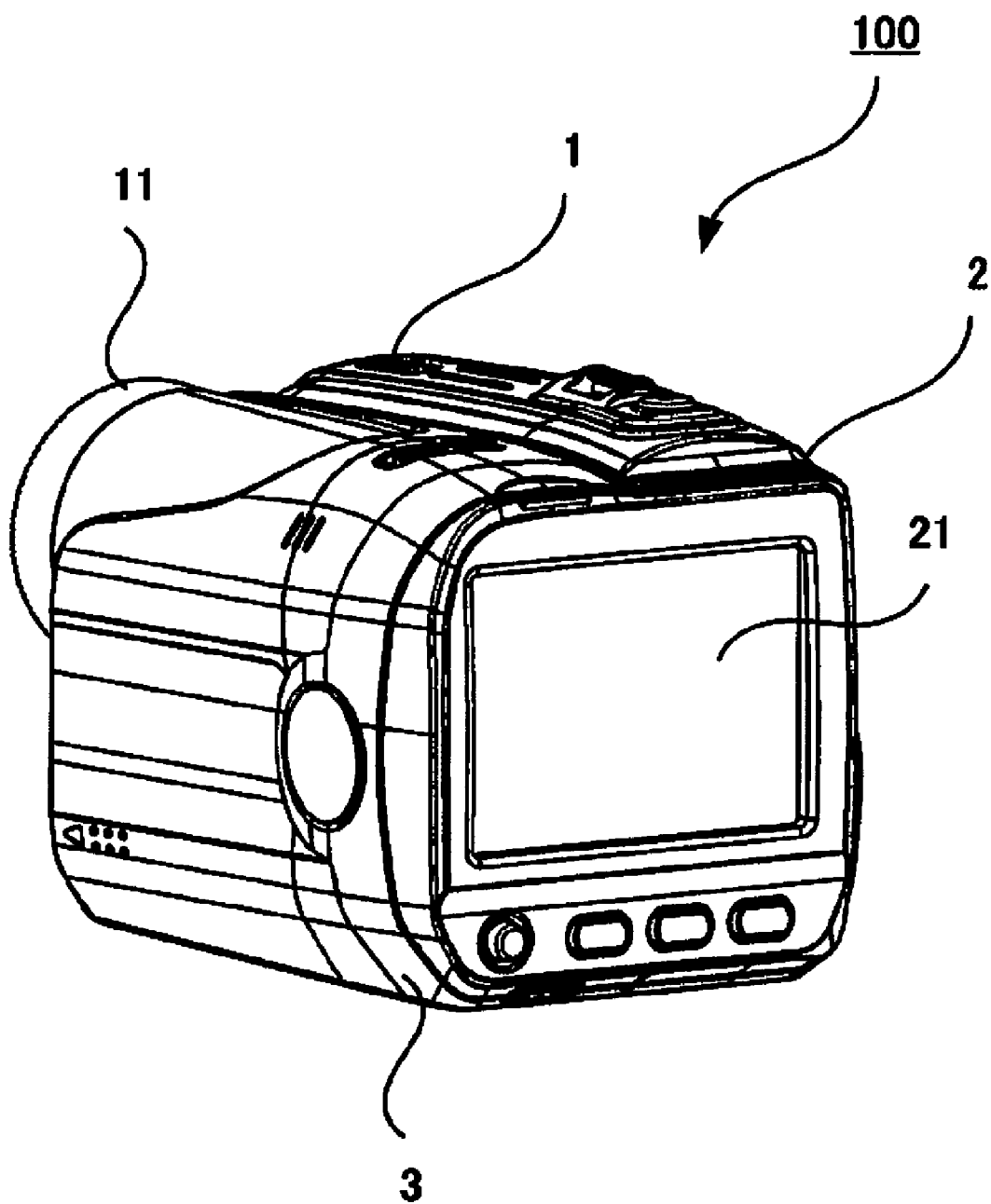
FIG. 1 is a perspective view of a camcorder according to an embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIG. 1 is a perspective view of a camcorder according to an embodiment of the invention.

Camcorder 100 comprises main body 1, lens 11 which is provided on a front surface portion of main body 1 and display unit 2 having display screen 21, which displays incoming image into lens 11. Main body 1 further comprises connection unit 3, which is provided on a rear surface portion of main body 1 opposite to the front surface portion. Display unit 2 configures a slide mechanism to be described later with connection unit 3 for support by main body 1. The slide mechanism allows display unit 2 to slide vertically along the rear surface portion of main body 1.

In an embodiment of the invention, the rear surface portion of main body 1 comprising connection unit 3 and the front surface portion of main body 1 comprising lens 11 are formed as different housings. The rear surface portion and the front surface portion can be formed as one housing.

Figure 2:
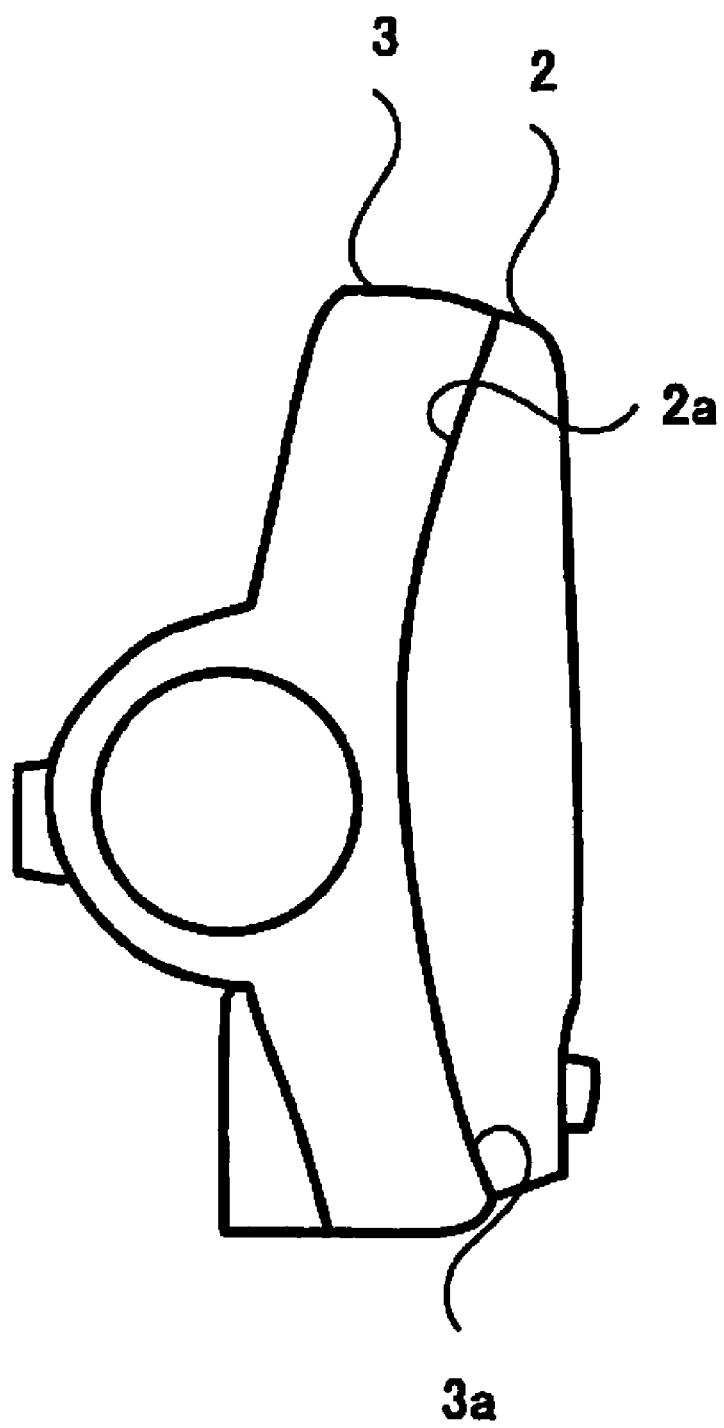
FIG. 2 is a partially enlarged view of a display unit and a connection unit according to a first embodiment.
Figure 3:
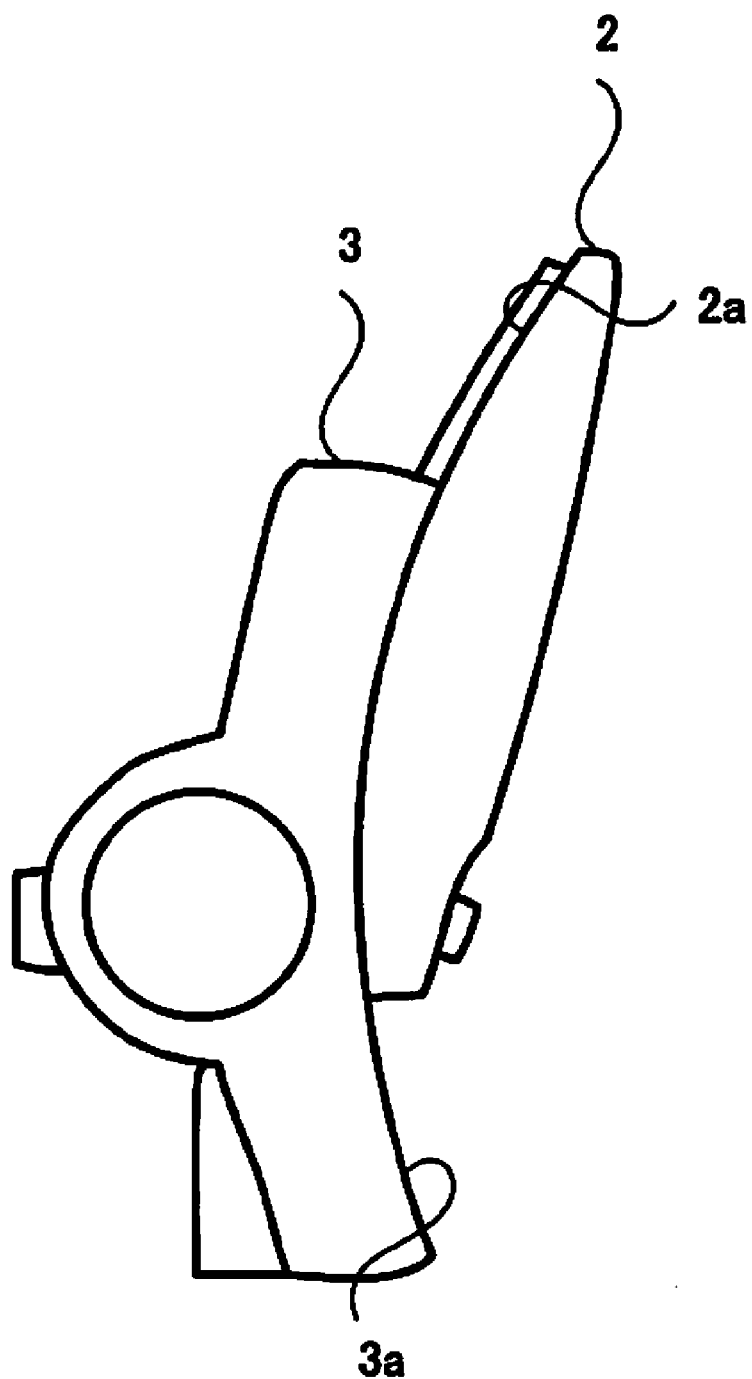
FIG. 3 is a partially enlarged view of a display unit and a connection unit according to a first embodiment.
Figure 4:
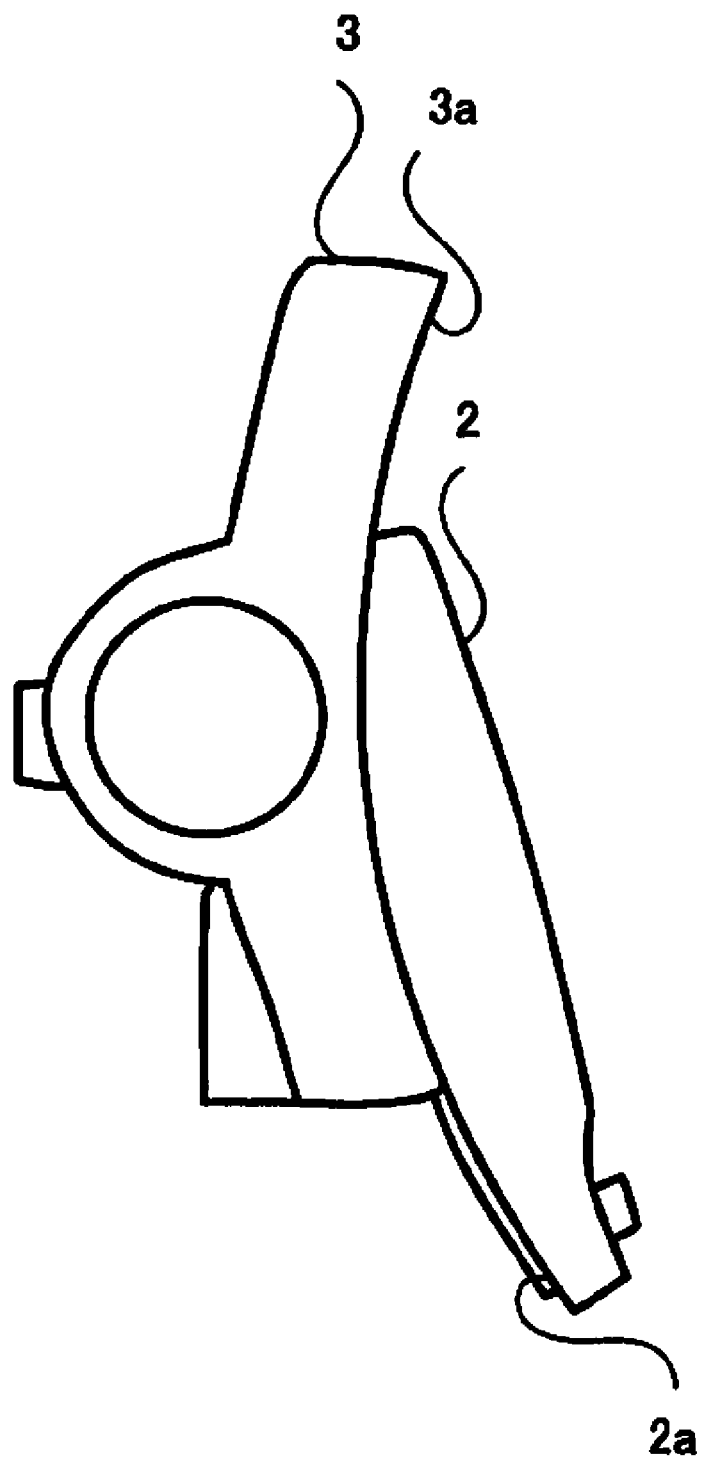
FIG. 4 is a partially enlarged view of a display unit and a connection unit according to a first embodiment.

FIGS. 2 to 4 describe partially enlarged views of display unit 2 and connection unit 3 according to an embodiment.

Surface 3a of connection unit 3 facing display unit 2 (hereinafter called front surface 3a of connection unit 3) and surface 2a of display unit 2 facing connection unit 3 (hereinafter called rear surface 2a of display unit 2) are curved surfaces and are formed in arcs having same curvature respectively. In the embodiment, front surface 3a is concave toward the front surface portion of main body 1. Rear surface 2a is convex toward the front surface portion of main body 1 and corresponding to front surface 3a. Furthermore, front surface 3a and rear surface 2a are the same in size.

FIG. 2 shows a first condition wherein rear surface 2a conforms to front surface 3a. The first condition shown in FIG. 2 can bethought of as a static position. In this static position, a first median of display unit 2 conforms with a second median of connection unit 3. The first median of display unit 2 (hereinafter called the first median) is parallel to upper and bottom ends of display unit 2 and passes through a center of the curved surface of rear surface 2a. The second median of connection unit 3 (hereinafter called the second median) is parallel to upper and bottom ends of connection unit 3 and passes through a center of the curved surface of front surface 3a.

Display unit 2 slides in an arc along front surface 3a. Furthermore, display unit 2 slides in up and down directions of main body 1. FIG. 3 shows a second condition wherein display unit 2 fully slides up from main body 1. In the second condition, the first median is placed in a higher position than the second median. FIG. 4 shows a third condition wherein display unit 2 fully slides down from the main body 1. In the third condition, the first median is placed in a lower position than the second median.

When display unit 2 is in the position shown in FIG. 3 a user could see an image displayed on display screen 21 of camcorder 100, which is held above a user's eye level. When display unit 2 is in the position shown in FIG. 4, the user could see an image displayed on display screen 21 of camcorder 100, which is held below the user's eye level.

As shown in FIGS. 2 to 4, display unit 2 turns around a center of an arc of rear surface 2a along connection unit 3. Display unit 2 may be turned by hand. The movement of display unit 2 is limited by connection unit 3. The angle of display unit 2 between the static position and other positions as shown in FIGS. 3 and 4 is called herein, a turn angle. The turn angle is limited to 15 degrees or smaller respectively. In other words, the angle between a first central axis of display unit 2 and a second central axis of display unit 2 is a maximum of 15 degrees. The first central axis of display unit 2 (hereinafter called the first central axis) is a line, which is perpendicular to main body 1 in the static position and passes through a center of the curved surface of rear surface 2a. The second central axis of display unit 2 (hereinafter called the second central axis) is a line, which is perpendicular to display 21 in the position as shown in FIGS. 3 and 4 and passes through the center of the curved surface of rear surface 2a. As the turn angle increase, display unit 2 can not slide and return to the static position from a position as shown in FIGS. 3 and 4 when camcorder 100 is roughly put on the ground or dropped.

Preferably, the curved surfaces of rear surface 2a and front surface 3a have radiuses between 60 mm and 100 mm. More preferably, the radiuses are between 85 mm and 90 mm. When the radius exceeds this range, the turn angle of display unit 2 may be limited by the size of connection unit 3. As the radius gets smaller, it is difficult to achieve the maximum turn-angle of the display unit 2.

Figure 5:
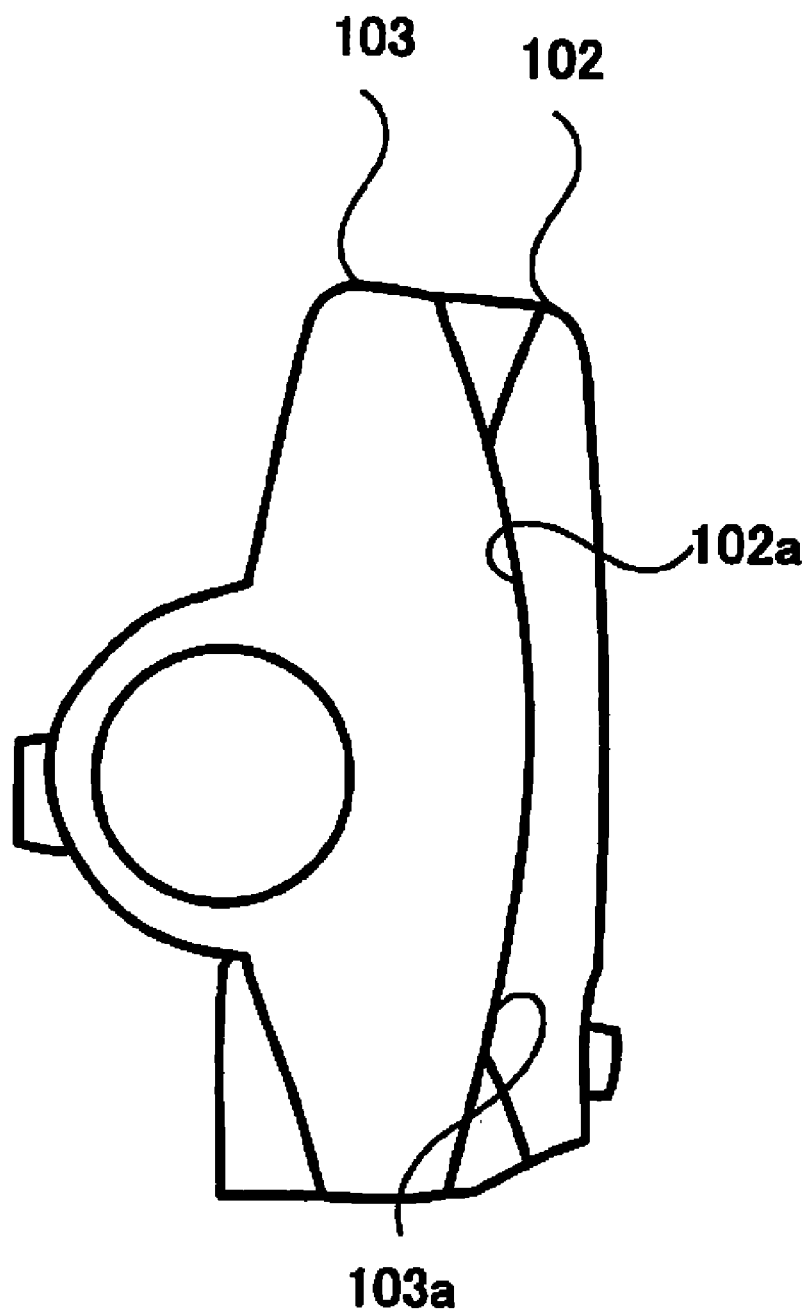
FIG. 5 is a partially enlarged view of a display and a connection unit according to another embodiment.

FIG. 5 shows a partially enlarged view of display unit 102 and connection unit 103 according to an embodiment. As shown in FIG. 5, front surface 103a may be formed as a convex surface toward the front surface portion of main body 1, and rear surface 102a may be formed as a concave surface toward the front surface portion of main body 1.

In addition, both a rear surface of a display unit and a front surface of a connection unit may be formed flat. In that regard, rear-side edges of side surfaces of the display unit and front-side edges of side surface of the connection unit are formed in a curved line with respect to one another. Alternatively, an attachment such as a bracket having slots in an arc may be placed on the rear surface of the display unit or the front surface of the connection unit. The conditions described in FIGS. 2 to 4 are accomplished as described above. The display unit could slidably move in up and down directions of main body 1.

Figure 6:
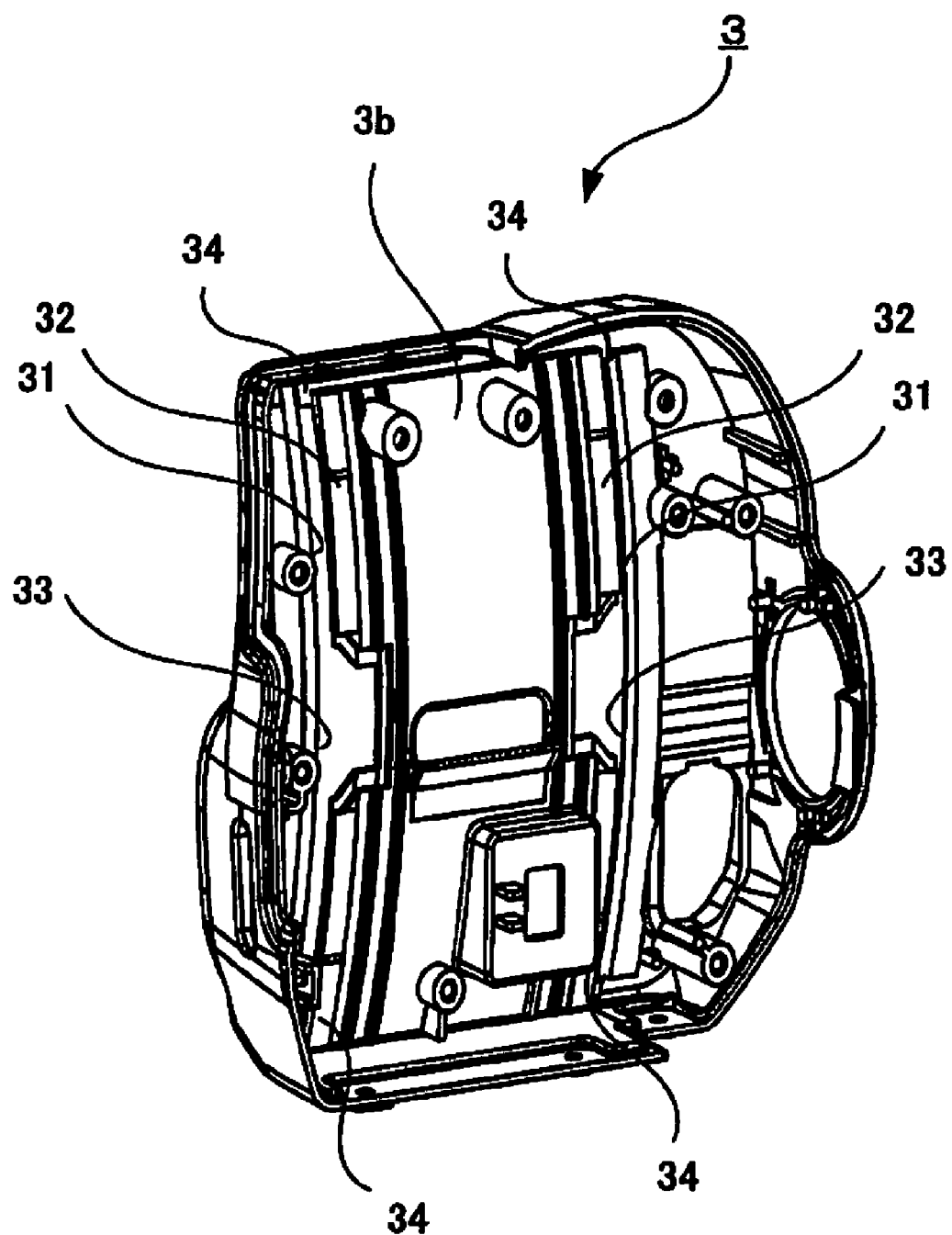
FIG. 6 is a perspective view of a supporting section formed on a connection unit according to a first embodiment.
Figure 7:
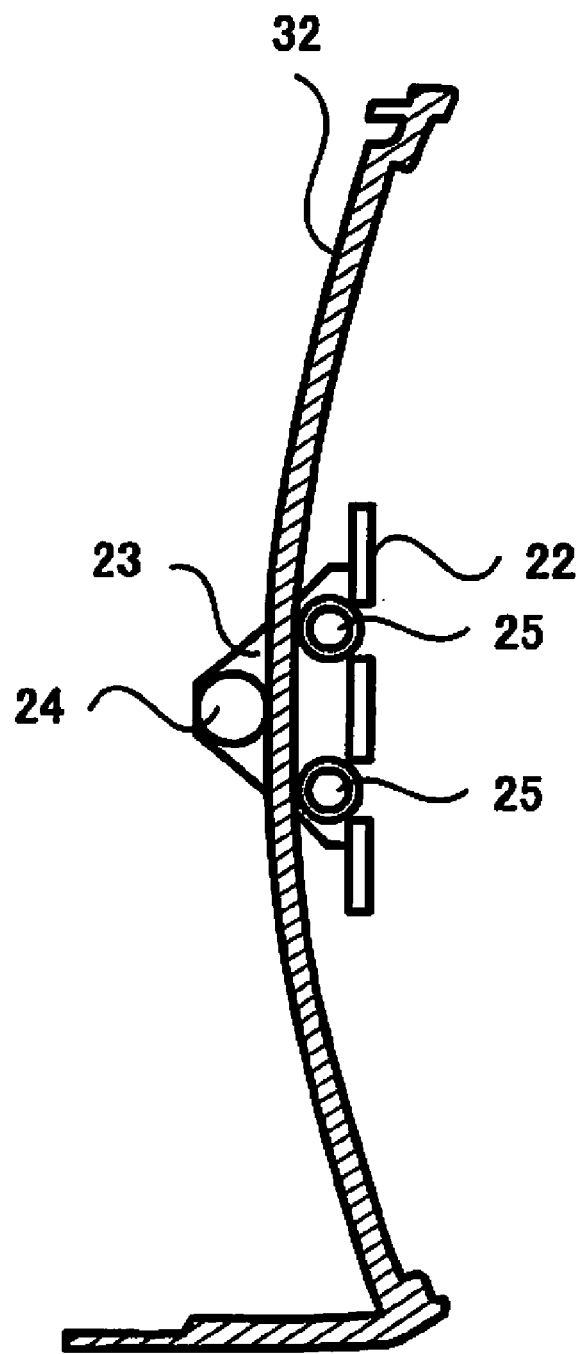
FIG. 7 is a cross-sectional view of a first embodiment of a slide mechanism.

FIGS. 6 and 7 show a first embodiment of a slide mechanism. The slide mechanism is composed of a portion of display unit 2 and a portion of connection unit 3. The portion of display unit 2 works as a moving section and the portion of connection unit 3 works as a supporting section. The supporting section supports the moving section of the slide mechanism according to the first embodiment and a second embodiment mentioned below. The slide mechanism is not limited to the embodiments and may differ as the portion of display unit 2 works as a supporting section and the portion of connection unit 3 works as a moving section. The only requirement is cooperation between display unit 2 and connection unit 3.

FIG. 6 shows a perspective view of the supporting section formed on connection unit 3 according to the first embodiment. The supporting section is formed on surface 3b of connection unit 3 (hereinafter called rear surface 3b) when connection unit 3 is viewed from the front surface portion of main body 1. Obviously, rear surface 3b is reverse side of front surface 3a, that means front surface 3a comprises the supporting section. The supporting section does not move with respect to main body 1.

Rear surface 3b has two parallel grooves 31 running from an upper end to a lower end of connection unit 3. Grooves 31 run along a sliding direction of the moving section and is described below. Rail 32, along which the moving section moves, is formed alongside each groove 31 and is centrally located. Accordingly, rail 32 run in up and down directions of connection unit 3. Groove 31 has wide part 33, which is formed in a central longitudinal region of groove 31 and increases the width of groove 31, there. Consequently, rail 32 is interrupted by wide part 33 centered on the second median. Furthermore, buffer 34 (a move restricting section) is formed at upper and lower ends of groove 31 or rail 32.

FIG. 7 shows a cross-sectional view of the slide mechanism according to the first embodiment. This figure shows the relation between rail 32 and the moving section in the static position described in FIG. 2. For simplicity, display screen 21 is not shown in FIG. 7. In the embodiment, rear surface 2a comprises the moving section. The moving section comprises bracket 22 and trapezoidal plate 23, which projects perpendicularly from bracket 22. Two brackets 22 are correspond with rails 32 respectively and are on the first median.

The width of trapezoidal plate 23 decreases with distance from bracket 22. Two plastic rollers 25 are fitted on a wider side of trapezoidal plate 23. Rubber roller 24 is fitted on a narrower side of trapezoidal plate 23. Rollers 24, 25 are fitted on a surface of trapezoidal plate 23, which is directed toward the center of display unit 2 with an axis of rotation perpendicular to the surface of trapezoidal plate 23.

Rail 32 is sandwiched between two plastic rollers 25 and rubber roller 24. That is, rubber roller 24 is in contact with a surface of rail 32 and two plastic rollers 25 are in contact with a rear surface of rail 32. Rubber roller 24 runs on rail 32.

Rubber roller 24 causes friction with rail 32 and applies torque to prevent unexpected movement of display unit 2. Preferably, the required torque to move display unit 2 is between 350 gfm and 850 gfm (equals to 3.43 Nm and 8.34 Nm). When rubber roller 24 is located in wide part 33, torque is absent because wide part 33 lacks rail 32. Consequently, the user could tactually detect that rubber roller 24 is located in wide part 33. Accordingly, wide part 33 has sufficient width to accommodate the size of rubber roller 24. Because wide part 33 disconnects rail 32 at the location where the second median is centered, the user perceives that display unit 2 is in static position by the sense of touch when locating rubber roller 24 in wide part 33.

Other ways to detect that display unit 2 is in a static position are by forming a small cut or a notch on rail 32, or forming a groove on rail 32 or a portion, wherein display unit 2 slides. Desirably, the slide mechanism could offer a tactile sense such as a small impact to the user by employing an aforementioned way.

Preferably, one of the three rollers fitted on trapezoidal plate 23 is formed of material having a higher coefficient of friction than the other two. In the previous mentioned manner, camcorder 100 could resist unpredictable movement of display unit 2.

Figure 8:
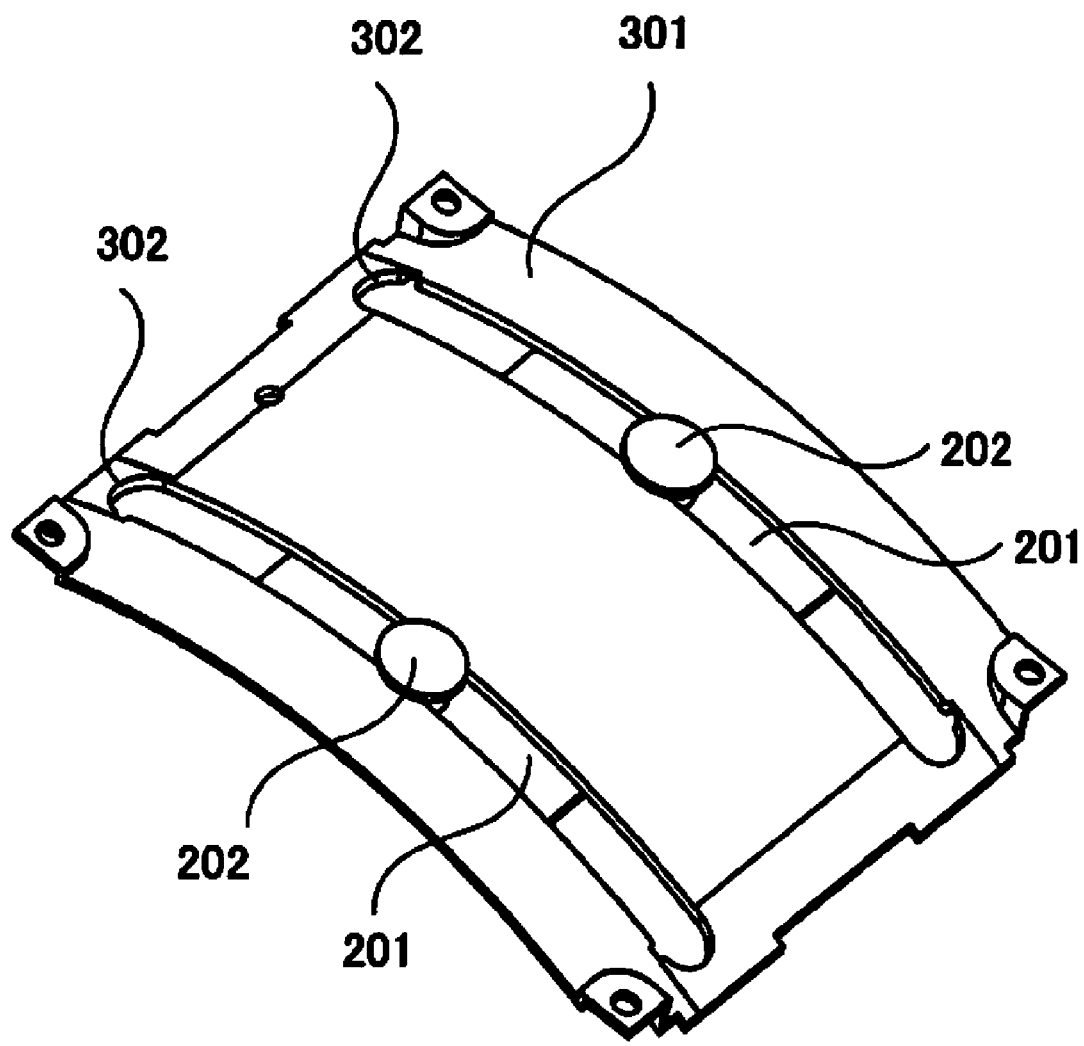
FIG. 8 is a cross-sectional view of a second embodiment of a slide mechanism.

FIG. 8 shows a cross-sectional view of a second embodiment of a slide mechanism. Plate 301 serves as a supporting section and has two parallel grooves 302. Plate 301 is fitted to front surface 3a of connection unit 3 so that grooves 302 extend from an upper end to a lower end of connection unit 3. Plate 301 has a curved surface, which has the same curvature as front surface 3a.

Stud 201 with support head 202 serves as a moving section. Studs 201 are fitted on rear surface 2a of display unit 2 and are supported by connection unit 3 by protruding through support head 202 into groove 302 respectively. A width or radius of support head 202 is larger than that of groove 302. Furthermore, stud 201 may be formed integrally with a bracket (not shown in the figure), which is fitted on rear surface 2a of display unit 2.

The position of display unit 2 to connection unit 3, which is shown in FIGS. 2 to 4 could change by moving studs 201 along grooves 302 in substantially vertical directions of main body 1.

Figure 9:
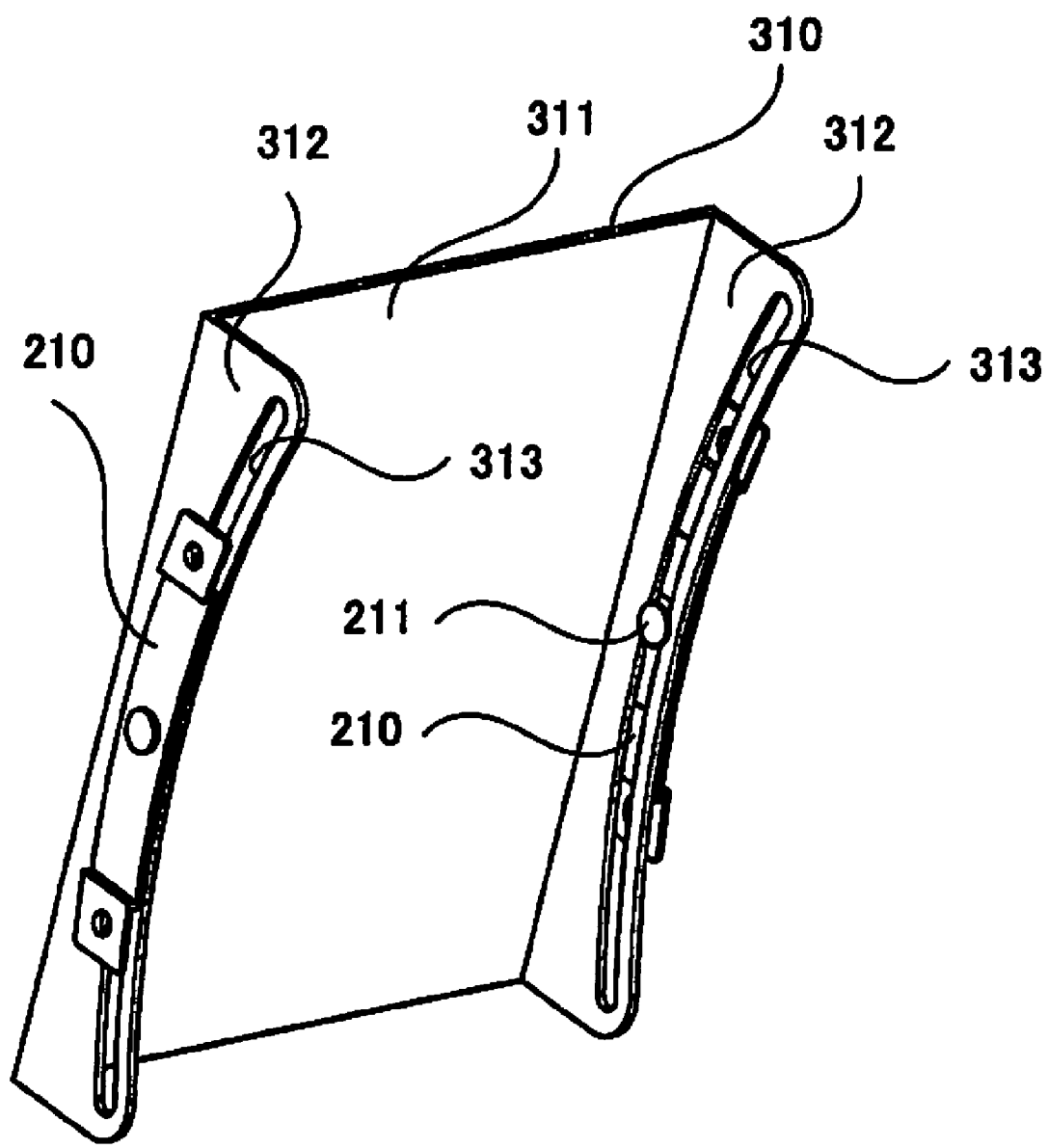
FIG. 9 is a cross-sectional view of a third embodiment of a slide mechanism.

Stud 201 and support head 202 may be formed as an integral unit. Or, stud 201 and support head 202 may be formed from two components such as a shank, which passes through groove 302 and connects to display unit 2 and a separate head such as a screw or bolt, which may be screwed to groove 302. Furthermore, stud 201 and support head 202 may form a connector through further components that connect shank 201 to head 202, and shank 201, head 202 themselves may comprise multiple parts. FIG. 9 shows a cross-sectional view of a third embodiment of a slide mechanism. The third embodiment is suitable for a camcorder, wherein a front surface of a connection unit and a rear surface of a display unit are flat. Bracket 310 serves as a supporting section. Bracket 310 comprises fixing surface 311, which is fixed to the front surface of connection unit and lateral sides 312, which rise perpendicularly from longitudinal sides of fixing surface 311. Lateral side 312 has arched groove 313 concave with fixing surface 311.

Flat spring 210 serves as the moving section and is fitted to each longitudinal side of the display unit. The width of flat spring 210 is wider than the width of arched groove 313. Flat spring 210 has rivet 211, whose diameter is larger than the width of arched groove 313. Flat spring 210 is supported on groove 313 by rivet 211.

Figure 10:
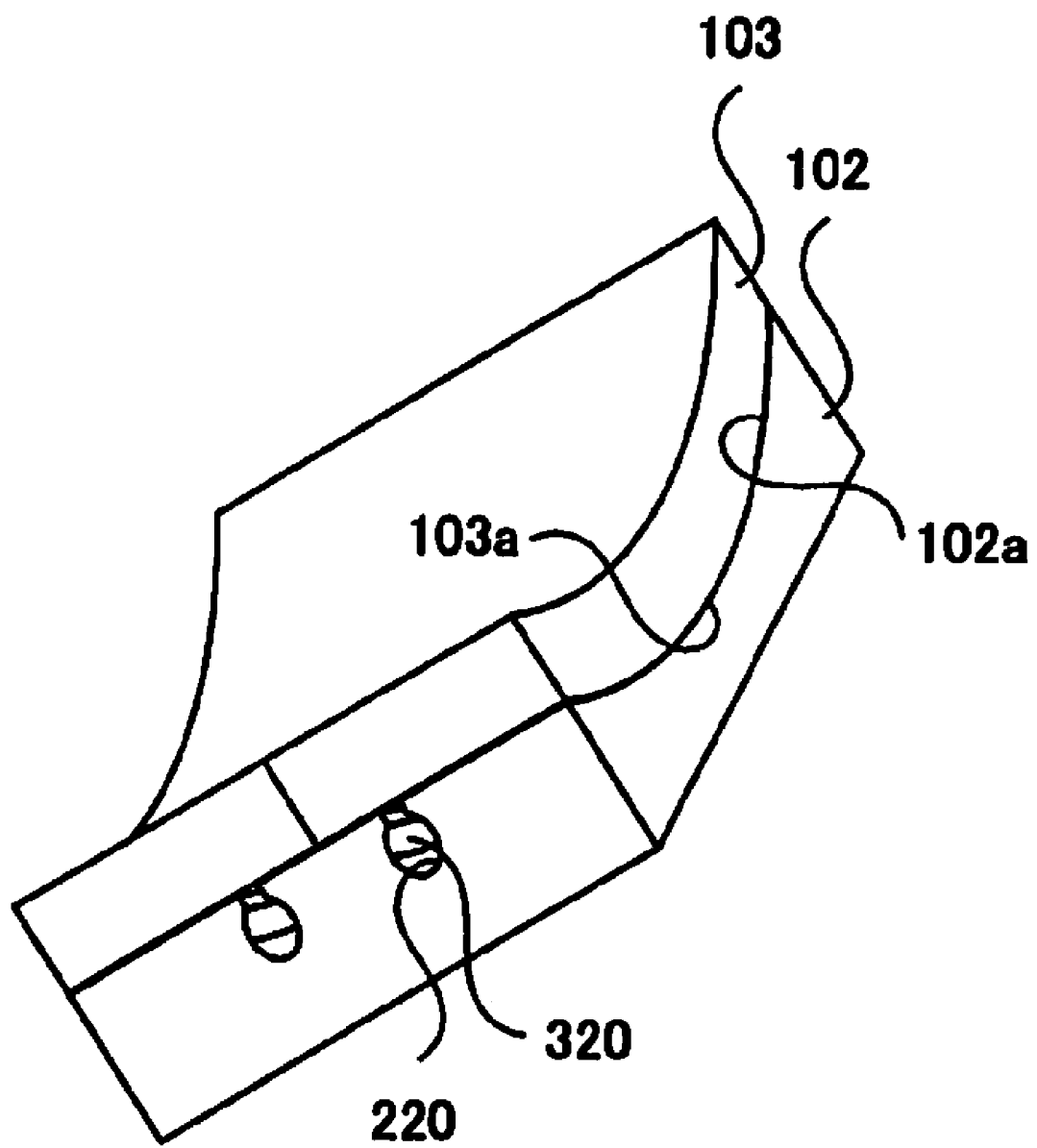
FIG. 10 is a cross-sectional view of a fourth embodiment of a slide mechanism.

FIG. 10 shows a cross-sectional view of a forth embodiment of a slide mechanism. In FIG. 10, the forth embodiment is adopted as the slide mechanism for display unit 102 and connection unit 103 shown in FIG. 5. Two cylindrical rails 320 are formed on connection unit 103 so as to extend from an upper end to a lower end of connection unit 103 and are set parallel to each other. Rail 320 serves as the supporting section. Rail 320 is formed integrally on front surface 103a of connection unit 103. Grooves 220, which are formed on rear surface 102a of display unit 102 serve as a moving unit. Grooves 220 are configured as a counterpart to rail 320. Grooves 220 are formed to extend from an upper end to a lower end of display unit 102 and correspond with rails 320.

Preferably, the move restricting section may be formed for safety improvement of the moving section and the supporting section in the embodiments. Moreover, friction is preferable between the moving section and the supporting section to protect display unit 2 or 102 from unpredictable movement.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A camcorder comprising:
a main body;
a lens provided on a front surface portion of the main body; and
a display unit having a display screen, which displays an image from the lens;
wherein the display unit is provided on a rear surface portion of the main body opposite to the front surface portion and slides in an arc vertically along the rear surface portion of the main body;
wherein the rear surface portion comprises a first curved surface, which faces the display unit and which is concave toward the front surface portion of the main body;
wherein the display unit comprises a second curved surface, which faces the main body and which is convex corresponding to the first curved surface;
wherein a portion of the first curved surface comprises a supporting section, which does not move with respect to the main body and a portion of the second curved surface comprises a moving section;
wherein the moving section comprises a first roller, a second roller and a third roller;
the supporting section comprises a rail running in up and down directions of the main body; and
wherein the first roller contacts a first surface of the rail and the second and third rollers contact a second surface of the rail.

2. The camcorder as claimed in claim 1,
wherein the first curved surface has a radius between 60 mm and 100 mm.

3. The camcorder as claimed in claim 1,
wherein the first curved surface and the second curved surface are equal; and
wherein the vertical movement of the display unit along the rear surface portion of the main body via first and second curved surfaces provides a maximum display unit turn angle 15 degrees.

4. The camcorder as claimed in claim 1,
wherein the first roller is formed of material having a higher coefficient of friction than that of the second and third rollers.

5. The camcorder as claimed in claim 1, comprising:
move restricting sections formed at the upper and lower ends of the rail.

6. The camcorder as claimed in claim 1,
wherein the torque of slide movement of the moving section along the sliding section is between 3.43 Nm and 8.34 Nm.

7. The camcorder as claimed in claim 1,
wherein the supporting section comprises a plate having a groove extending from an upper end to a lower end of the main body; and
the moving section comprises a stud that protrudes through the groove.

* * * * *